(12) United States Patent
Baba et al.

(10) Patent No.: US 7,270,390 B2
(45) Date of Patent: Sep. 18, 2007

(54) DATA CREATING METHOD AND INK JET PRINTING APPARATUS

(75) Inventors: Naoko Baba, Kawasaki (JP); Daigoro Kanematsu, Yokohama (JP); Kazuo Suzuki, Yokohama (JP); Mitsutoshi Nagamura, Tokyo (JP); Tomomi Furuichi, Yokohama (JP); Rie Takekoshi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 11/066,285

(22) Filed: Feb. 28, 2005

(65) Prior Publication Data

US 2005/0200642 A1    Sep. 15, 2005

(30) Foreign Application Priority Data

Mar. 5, 2004  (JP)  ............................ 2004/063072

(51) Int. Cl.
B41J 2/205  (2006.01)
(52) U.S. Cl. .......................................... 347/15; 347/43
(58) Field of Classification Search ................ 347/14, 347/15, 43
See application file for complete search history.

(56) References Cited

U.S. PATENT DOCUMENTS

| | | | |
|---|---|---|---|
| 5,338,597 A | 8/1994 | Kurabayashi et al. | 428/195 |
| 5,608,438 A | 3/1997 | Koike et al. | 347/100 |
| 5,751,310 A | 5/1998 | Yano et al. | 347/43 |
| 5,887,124 A | 3/1999 | Iwasaki et al. | 395/109 |
| 5,907,666 A | 5/1999 | Yano et al. | 395/109 |
| 6,062,674 A | 5/2000 | Inui et al. | 347/43 |
| 6,087,604 A * | 7/2000 | Moriyama et al. | 347/15 |
| 6,145,260 A | 11/2000 | Morton | 347/41 |
| 6,186,615 B1 * | 2/2001 | Sato et al. | 347/43 |
| 6,312,102 B1 * | 11/2001 | Moriyama et al. | 347/43 |
| 6,709,082 B2 | 3/2004 | Kaneko | 347/15 |
| 6,805,422 B2 | 10/2004 | Takahashi et al. | 347/15 |
| 6,896,348 B2 | 5/2005 | Takekoshi et al. | 347/15 |
| 2003/0151642 A1 | 8/2003 | Kaneko | 347/43 |

FOREIGN PATENT DOCUMENTS

| | | |
|---|---|---|
| JP | 7-47762 | 2/1995 |
| JP | 8-281930 | 10/1996 |
| JP | 2003-159827 | 6/2003 |

* cited by examiner

*Primary Examiner*—Thinh Nguyen
(74) *Attorney, Agent, or Firm*—Fitzpatrick, Cella, Harper & Scinto

(57) ABSTRACT

In a data creating method for creating image data corresponding to each of a plurality of color inks applied to a black image area formed on the basis of image data on a black ink, with the plurality of color inks being a cyan ink, a magenta ink, and a yellow ink, an image data creating step creates image data corresponding to each of the plurality of color inks on the basis of the image data on the black ink. The image data creating step creates the image data on each of the plurality of color inks so that the rate of areas in which all the plurality of color inks are applied, in the black image area, is higher than that of areas to which only some of the plurality of color inks are applied. At least one of the cyan ink, the magenta ink, and the yellow ink contains a component that coagulates a color material of the black ink.

15 Claims, 13 Drawing Sheets

FIG.8A

| COLOR INDEX DATA (2bit) | INDEX EXPANSION PATTERN |
|---|---|
| 00 | (empty 2×2) |
| 01 | (one filled, top-left) |
| 10 | (two filled, left column) |
| 11 | (three filled) |

FIG.8B

| COLOR INDEX DATA (2bit) | | COLOR INK APPLICATION DATA (1bit) | | PRINT DATA (2bit) |
|---|---|---|---|---|
| 00 | + | 1 | → | 01 |
| 01 | + | 1 | → | 01 |
| 10 | + | 1 | → | 10 |
| 11 | + | 1 | → | 11 |

FIG.12A

| COLOR INDEX DATA (2bit) | INDEX EXPANSION PATTERN |
|---|---|
| 00 | ▦ |
| 01 | ▦ |
| 10 | ▦ |
| 11 | ▦ |

FIG.12B

| BLACK INDEX DATA (2bit) | INDEX EXPANSION PATTERN | INK APPLICATION MATRIX INFORMATION |
|---|---|---|
| 00 | ⊞ | → 0 |
| 01 | ◧ | → 0 |
| 10 | ◧ | → 1 |
| 11 | ◪ | → 1 |

FIG.12C

| COLOR INDEX DATA (2bit) |  | COLOR INK APPLICATION DATA (1bit) |  | PRINT DATA (2bit) |
|---|---|---|---|---|
| 00 | + | 1 | → | 10 |
| 01 | + | 1 | → | 10 |
| 10 | + | 1 | → | 10 |
| 11 | + | 1 | → | 11 |

DATA CREATING METHOD AND INK JET PRINTING APPARATUS

BACKGROUND OF THE INVENTION

1. Field of the Invention

The present invention relates to a data creating method and an ink jet printing apparatus, and more specifically, to the formation of an image which is carried out by ejecting a combination of inks such as a black ink and color inks which exhibit different levels of permeability for print media and similarly to the formation of an image which is carried out by allowing color inks to react with a black ink to coagulate the black ink.

2. Description of the Related Art

An ink jet printing method and apparatus for printing various print media have prevailed as output means for various apparatuses such as personal computers because the method and apparatus enables dense and fast printing operations.

The ink jet printing apparatus generally comprises a carriage on which a print head and ink tanks are mounted, conveying means for conveying a print medium such as a print paper and a printable disk, and control means for controlling the carriage and the conveying means. Serial scan is carried out by moving the print head that ejects ink droplets, in a direction (main scanning direction) orthogonal to one (sub-scanning direction) in which the print medium is conveyed, while ejecting ink from a plurality of ejection openings in the print head. On the other hand, during non-printing, the print medium is intermittently conveyed by an amount equal to a print width.

The ink jet printing apparatus carries out printing by ejecting ink to a print medium in accordance with a print signal. Further, the apparatus need not be complicated and thus requires only a low running cost. The ink jet printing apparatus is also known to operate quietly.

In recent years, many products have been put to practical use which can deal with color printing by using a plurality of color inks.

With such a color ink jet printing apparatus that can deal with color printing, for black ink often used to print characters and the like, it is necessary to provide sharp and clear printing and a high print density. As means for achieving this, a technique is known which lowers the permeability of the black ink for print media to suppress the permeation, through print media, of a color material contained in the black ink. On the other hand, concerning color inks, when two different color inks are applied to print media so as to lie adjacent to each other on the media, the inks may be mixed together at their boundary to degrade color images (bleeding). A technique is thus known which lowers the permeability of the color inks for the print media to prevent the inks from being mixed together on the surfaces of the print media, thus preventing the bleeding (see Japanese Patent Application Laid-Open No. 7-047762).

However, if an ink jet is used which includes such a low-permeability black ink and high-permeability color inks, the color inks permeate well and require a relatively short time for fixation. In contrast, the black ink does not permeate well and thus requires a relatively long time for drying and fixation.

Accordingly, when two print media are consecutively printed and discharged, the second print medium may be discharged before the black ink on the first print medium discharged is completely dried. In this case, a print surface of the first print medium or a back surface of the second print medium may be stained (the phenomenon in which the print surface or the back surface are stained is called "smear").

This problem may become more serious as print speed increases. That is, a new printing operation cannot be performed before the black ink in an image formed on a discharged print medium is completely dried. To avoid the smear, measures described below have hitherto been taken.

One of the measures is a method of providing a fixer to fix inks to the print surfaces of print media (see Paragraph [0048] in Japanese Patent Application Laid-Open No. 7-047762).

The fixer may be, for example, of a heating type. The heating fixer can substantially perfectly remove the moisture from inks provided. Consequently, the inks can be favorably fixed. However, this requires an increase in the size and cost of the printing apparatus. In other words, it is disadvantageously impossible to achieve a reduction in the size and cost the apparatus, which is a unique advantage of the ink jet printing apparatus. Further, with a serial printer, although print media are intermittently conveyed, the use of the fixer may make the conveyance nonuniform.

A second measure is a method called sheet discharging wait control in which the discharging of print media is temporarily stopped.

According to this method, before a printed first print medium is fully dried, the printing of a second print medium is not started. Alternatively, after the second print medium has been printed, the start of a sheet discharging operation is delayed a certain time.

With this control, the second print medium is discharged after the image formed on the first medium has been fully dried. This makes it possible to restrain the occurrence of smear. However, if such control is performed, a sufficient print speed cannot be ensured.

In particular, recently developed ink jet printing apparatuses can carry out high-speed printing at the rate of 15 to 20 sheets per minute. Accordingly, the print speed is an important factor that characterizes the apparatus. However, the above control may reduce the print speed. This means that the performance of the apparatus may be degraded.

A third measure is a printing method in which high-permeability color inks overlap print areas of a black ink.

As such a method, Japanese Patent Application Laid-Open No. 2003-159827 discloses an ink jet printing method of determining whether or not to apply high-permeability color inks to a predetermined area of a print medium as well as the amount of color inks applied, depending on whether a low-permeability black ink is applied to the predetermined area with a high duty or a low duty. According to this method, the black ink and the color inks may be applied to the print medium in an arbitrary order, but in view of a reduction in the time required to fix the black ink, it is preferable to eject the color inks before the black ink.

In this case, the black ink is printed on a sheet surface wetted with the color inks. Consequently, the black ink is more readily fixed to the sheet surface. It is thus possible to suppress the occurrence of smear.

A fourth measure is a method of using a reactive ink system in which color inks contain a substance that, when mixed with a black ink, reacts with and instantaneously coagulates the black ink.

As such a method, Japanese Patent Application Laid-Open No. 8-281930 discloses an ink jet printing method of using color inks one of which contains a component for coagulating a black ink to improve its rigidity and ejecting the black ink to a part of a print medium to which the color inks have already been ejected. With this method, if the color ink containing the coagulating component is combined with the black ink, the resulting color is black with the tint of the color ink combined with the black ink. Consequently, toning occurs to make the image more blackish. Thus, it is possible to form pixels composed of a combination of another color ink and the black ink.

In this case, the color material of the black ink is coagulated and thus does not permeate through the print medium. Consequently, much of the color material remains on the surface of the print medium. This makes it possible to increase the density of black images. Further, the black ink is more readily fixed to the print medium. This suppresses the occurrence of bleeding and smear.

Not only Japanese Patent Application Laid-Open No. 8-281930 but also Japanese Patent Application Laid-Open No. 2003-159827, described above, disclose the system in which the color ink reacts with the black ink.

With the conventional ink jet printing method of applying the color inks to print areas of the black ink, the occurrence of smear can be sufficiently suppressed. The method also achieves a sufficiently high image grade for that day and age. However, in recent years, with the further advancement of the ink jet printing method, a further improvement in image grade has been desired.

With reference to FIG. 4, description will be given of problems that may occur with the conventional printing method in which the color inks overlap the black ink.

In FIG. 4, reference numeral 41 denotes a mask pattern for a cyan (C) ink. Reference numeral 42 denotes a mask pattern for a magenta (M) ink. Reference numeral 43 denotes a mask pattern for a yellow (Y) ink. Each of these mask patterns are composed of 6 (pixels)×16 (pixels). An AND process is executed on black data and each of these color mask patterns to determine the arrangement of color dots (dot arrangement 44) overlapping a black image area. In the figure, white parts of the mask patterns 41, 42, and 43 correspond to masked portions (non-printed pixels) and contain pixels that do not permit ejection of the inks. On the other hand, parts with slanted and horizontal lines correspond to pixels that permit ejection of the inks (printed pixels). In other words, in the mask patterns 41, 42, and 43, the areas with slanted and horizontal lines which are shown at 411, 422, and 433 correspond to the printed pixels.

When the color inks are ejected by overlapping manner to a black image area, the mask patterns 41, 42, and 43 are arranged repeatedly in the vertical and horizontal directions of the black data to print.

When the mask patterns 41, 42, and 43 are used to apply the color inks, the inks C, M, and Y are applied so as to form a dot arrangement shown in the dot arrangement 44. Specifically, the color inks are ejected by overlapping manner to form C, M, Y, red (R), green (G) blue (B), and process black.

For the areas in the dot arrangement 44 which contain slanted, horizontal lines and their combination, C is formed in the area with left slanted lines (for example, the area 441). M is formed in the area with right slanted lines (for example, the area 442). Y is formed in the area with horizontal lines (for example, the area 443). B is formed in the area with a combination of left and right slanted lines (for example, the area 444). G is formed in the area with a combination of left slanted lines and horizontal lines (for example, the area 445). R is formed in the area with a combination of right slanted lines and horizontal lines (for example, the area 446). K is formed in the area with a combination of left and right slanted lines and horizontal lines (for example, the area 447).

When the dot arrangement 44 is used to elect the color inks by overlapping manner to print areas of the black ink in a solid black image, the color inks may bleed from the periphery of black dots. The bleeding may make the tints C, M, Y, R, G, and B of the color inks outstanding to impair the uniformity of the black color. This may degrade the black image. In particular, with a conventional technique such as the one shown in FIG. 4, the number of areas 447 for process black is relatively smaller than that of other areas (for example, areas 441, 442, 443, or the like). Accordingly, the area 447 for process black is not predominant. Thus, the color ink overlapping area (for example, the area 441, 442, 443, or the like) spreading out from the black image area is easily perceived. This may degrade the black image.

Further, when for example, the area 441 for C and the area 442 for M are adjacent to each other as in the dot arrangement 44, the inks C and M are merged together. The merged inks are likely to shift from an impacting position. As a result, the color inks are likely to spread out from the black area as described above.

SUMMARY OF THE INVENTION

It is an object of the present invention to provide a data creating method and an ink jet printing apparatus which minimize a variation in the tint of an image formed by a predetermined ink (for example, a black ink) having a low fixability, compared to the prior art, even if a plurality of color inks (for example, a cyan, magenta, and yellow inks) including an ink(s) which improves the fixability of the predetermined ink are added to an image area formed of the predetermined ink.

In a first aspect of the present invention, there is provided a data creating method for creating image data corresponding to each of a plurality of color inks applied to an image area formed on the basis of image data on a predetermined ink, the plurality of color inks being different from the predetermined ink, at least one color ink of the plurality of color inks having at least one of a first characteristic that improves permeability of the predetermined ink and a second characteristic that coagulates a color material in the predetermined ink, the method comprising:

an image data creating step of creating image data corresponding to each of the plurality of color inks on the basis of the image data on the predetermined ink, wherein the image data creating step creates the image data on each of the plurality of color inks so that the rate of areas in which all the plurality of color inks overlap, in the image area is higher than that of areas to which only some of the plurality of color inks, in the image area are applied.

In a second aspect of the present invention, there is provided a data creating method for creating image data used to apply a cyan ink, a magenta ink, and a yellow ink to a black image area formed on the basis of image data on a black ink, at least one of the cyan ink, the magenta ink, and the yellow ink having at least one of a first characteristic that improves permeability of the black ink and a second characteristic that coagulates a color material in the black ink, the method comprising:

an image data creating step of creating image data corresponding to each of the cyan ink, the magenta ink, and the yellow ink on the basis of the image data on the black ink, wherein the image data creating step creates image data on each of the cyan ink, the magenta ink, and the yellow ink so that the rate of pixels in which the three color inks in cyan, magenta, and yellow overlap, in the black image area is higher than that of pixels to which only one or two of the three color inks are applied.

In a third aspect of the present invention, there is provided a data creating method for creating image data used to apply a plurality of color inks in cyan, magenta, and yellow to a black image area formed on the basis of image data on a black ink, at least one of the plurality of color inks having at least one of a first characteristic that improves permeability of the black ink and a second characteristic that coagulates a color material in the black ink, the method comprising:

an image data creating step of creating image data corresponding to each of the cyan ink, the magenta ink, and yellow ink on the basis of the image data on the black ink, and wherein the image data creating step creates the image data corresponding to each of the cyan ink, the magenta ink, and yellow ink so that the black image area is composed of pixels to which only the black ink is applied and pixels to which the three color inks in cyan, magenta, and yellow are applied so as to overlap.

In a fourth aspect of the present invention, there is provided the ink jet printing apparatus comprising;

a print head for ejecting at least a predetermined ink and a plurality of color inks different from the predetermined ink, at least one color ink of the plurality of color inks having at least one of a first characteristic that improves permeability of the predetermined ink and a second characteristic that coagulates a color material in the predetermined ink;

a data creating portion for executing the data creating method according to claim 1;

a print control means for ejecting inks from the print head on the basis of a print data created by the data creating portion.

In a fifth aspect of the present invention, there is provided a computer program for causing a computer to execute the data creating method according to claim 1.

According to an embodiment of the present invention, when a plurality of color inks (for example, a cyan, magenta, and yellow inks) including an ink(s) which improve the fixability of a predetermined ink (for example, a black ink) having a low fixability are added to an image area formed by the predetermined ink, a plurality of the color inks are appropriately combined together to minimize a variation in the tint of the image formed by the predetermined ink. This makes it possible to suppress the degradation of images which occurs by adding a plurality of the color inks.

The above and other objects, effects, features and advantages of the present invention will become more apparent from the following description of embodiments thereof taken in conjunction with the accompanying drawings

BRIEF DESCRIPTION OF THE DRAWINGS

FIG. 8A is a diagram illustrating dot expansion of the 2-bit color index data during printing according to the embodiment of the present invention;

FIG. 8B is a diagram illustrating logical calculation process executed on original data on each color in a 2-bit index form (multivalued) and ink application data according to the embodiment of the present invention;

FIG. 12A is a diagram illustrating dot expansion of 2-bit color index data during printing according to the embodiment of the present invention;

FIG. 12B is a diagram illustrating dot expansion of 2-bit black index data during printing according to the embodiment of the present invention;

FIG. 12C is a diagram illustrating a logical calculation for creating print data on the colors from original data on the colors and ink application data according to the embodiment of the present invention.

DETAILED DESCRIPTION OF PREFERRED EMBODIMENTS

An embodiment of the present invention will be described below with reference to the drawings.

Figure 1:
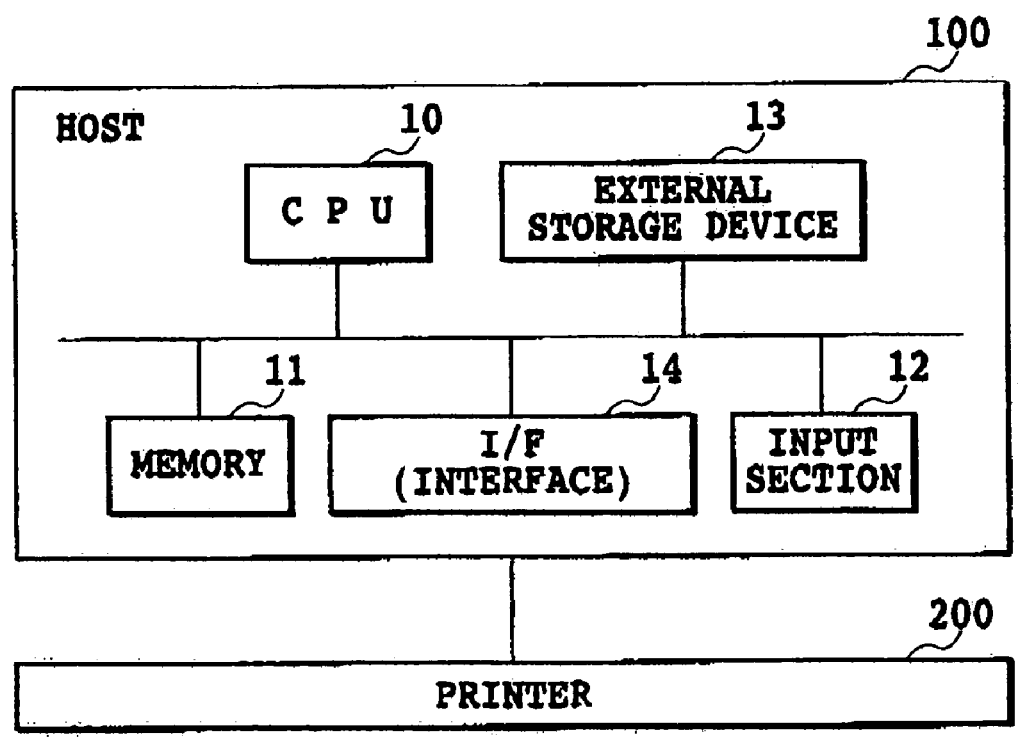
FIG. 1 is a block diagram showing the configuration of a printing system according to an embodiment of the present invention.

FIG. 1 is a block diagram showing the configuration of a printing system according to the embodiment of the present invention.

In the FIG. 1, a host 100 serving as an information processing apparatus is implemented as, for example, a personal computer. The host 100 comprises a CPU 10, a memory 11, an external storage section 13, an input section 12 such as a keyboard, and an interface 14 for communication with an ink jet printing apparatus 200. In accordance with programs stored in a memory 11, the CPU 10 executes color processing, image processing including such as quantization, and a print data creating process according to the embodiment of the present invention. These programs are stored in the external storage device 13 or supplied by an external device. The host 100 is connected via an interface to the ink jet printing apparatus 200, serving as a printing apparatus. Accordingly, after being subjected to image processing, print data is transmitted to the ink jet processing apparatus 200 for printing.

Configuration of Ink Jet Printing Apparatus

Figure 2:
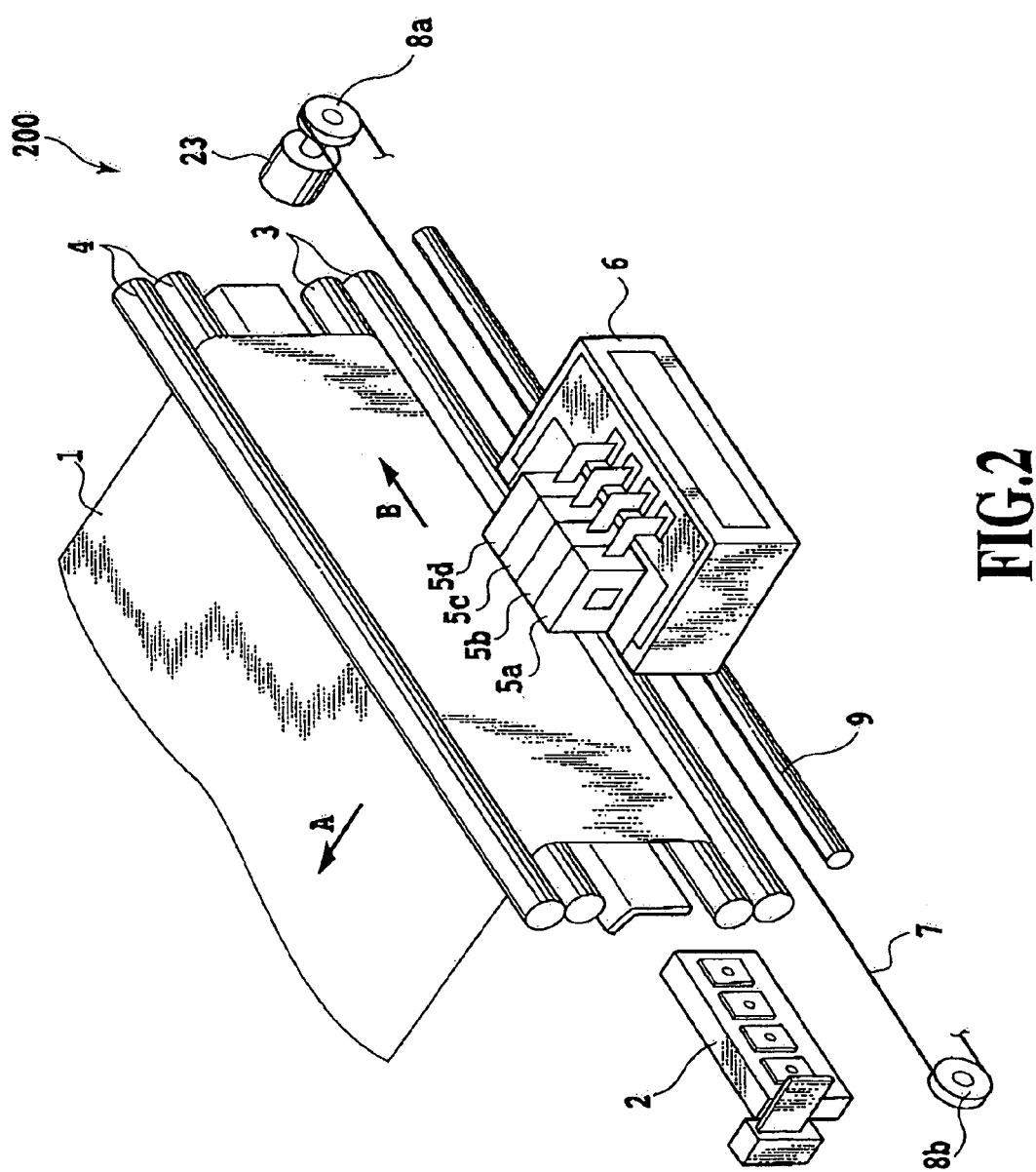
FIG. 2 is a schematic perspective view showing the mechanical configuration of an ink jet printing apparatus according to the embodiment of the present invention.

FIG. 2 is a schematic perspective view showing the mechanical configuration of the ink jet printing apparatus 200 according to the embodiment of the present invention.

In the ink jet printing apparatus 200, a paper feeding cassette (not shown) is provided in which print mediums 1 such as plural sheets of paper, plastic sheets are stacked. During printing, a paper feeding roller (not shown) provided opposite the paper feeding cassette separates each sheet from the others for the print mediums 1 and supplies the separated print medium 1 to a conveying path. A first conveying roller 3 and a second conveying roller 4 are provided in the conveying path so that there is a predetermined spacing between the rollers 3 and 4. The conveying rollers 3 and 4 are driven by a first conveying roller driving motor and a second conveying roller driving motor (not shown). The conveying rollers 3 and 4 convey the print medium 1 supplied by the paper feeding cassette to a position opposite to a print head 5 serving as printing means.

The print head 5 is based on an ink jet system and ejects ink to the print medium 1 for printing. The print head is supplied with ink from ink cartridges (not shown). The print head 5 is driven in accordance with an ejection signal to eject ink from its ink ejection openings. More specifically, electrothermal converting elements are provided in ink paths corresponding to the ink ejection openings in the print head. Thermal energy generated by the electrothermal converting elements is utilized to generate bubbles in ink to eject the ink under the pressure of the bubbles. The print head 5 and the ink cartridges are mounted on a carriage 6. The driving force of a carriage motor 23 is transmitted to the carriage 6 via a belt 7 and pulleys 8a and 8b Thus, the carriage 6 can be reciprocated along a guide shaft 9 to scan the print head.

According to the embodiment of the present invention, color inks in C, M, and Y are used. However, the present invention is not limited to this. For example, other color inks in red (R), skin color (S), light cyan, light magenta, and the like may be used. Further, the number of color inks used is not limited to three. An arbitrary number of types such as five types may be used in accordance with the performance of the ink jet printing apparatus.

With the above configuration, the print head ejects the ink to the print medium 1 in accordance with an ejection signal while carrying out scan in the direction of arrow B in the figure. The print head thus forms ink dots on the print medium 1 for printing. The print head 5 moves to its home position and uses an ejection recovering device 2 to perform a recovery operation, as required. This dissolves a problem such as clogging of the ejection openings. The conveying roller pair 3 and 4 are driven between a print operation carried out during a former scan and a print operation carried out during a latter scan to convey the print medium 1 by a predetermined amount in the direction of an arrow A. Thus, printing operation is repeatedly alternated with a conveying operation for the predetermined amount performed by the conveying rollers 3 and 4, to form the image.

Simultaneously with the image forming operation, the print medium 1 is discharged to a paper discharging section (not shown) by a paper discharging mechanism (not shown) provided downstream of the scan area of the print head in the conveying path for the print medium.

The print head according to the embodiment of the present invention may comprise a piezoelectric element that is deformed in accordance with an applied voltage.

Figure 3:
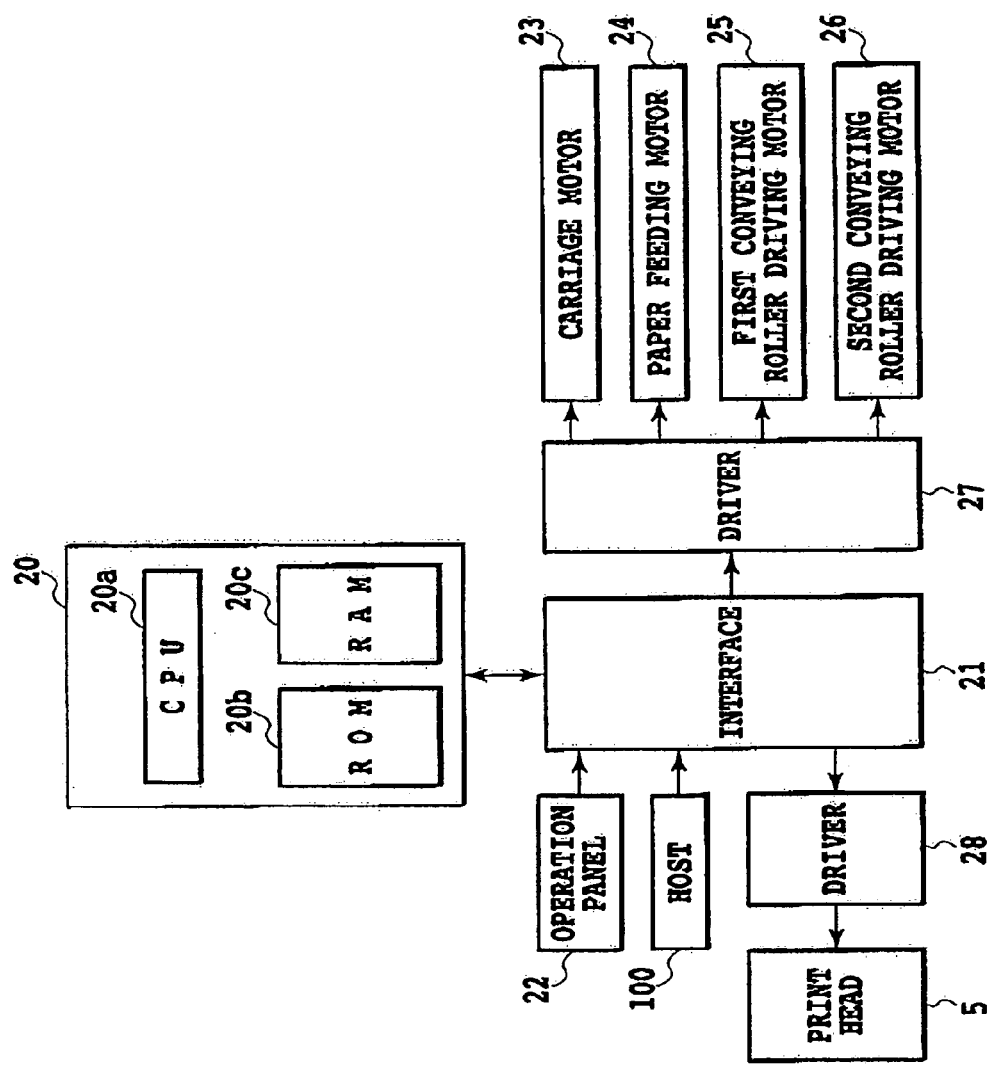
FIG. 3 is a block diagram showing a control setup of the ink jet printing apparatus according to the embodiment of the present invention.

In FIG. 3, the control section 20 comprises a CPU 20a, for example, a microprocessor, a ROM 20b in which control programs for the CPU 20a and various data are stored, and a RAM 20c used as a work area for the CPU 20a and temporarily storing various data such as print data. The control section 20, an operation panel 22, a driver 27 for driving motors (carriage driving motor 23, a paper feeding roller driving motor 24, a first conveying roller pair driving motor 25, and a second conveying roller pair driving motor 26), and a driver 28 for driving the print head 5 are connected to an interface 21 for transmitting and receiving information such as data or commands to and from the elements.

First Embodiment

According to the present embodiment, when a plurality of color inks including a ink(s) which improves the fixability of the predetermined ink are added to image areas of a predetermined ink with a low fixability, print data on colors is created so that the tint of a color formed by combining the plurality color inks added is similar to the tint of the predetermined ink.

Here, a first to third aspects shown below are applicable to the "predetermined ink" and the "ink which improves the fixability of the predetermined ink".

According to the first aspect, the "predetermined ink" has a predetermined level of permeability, while the "ink which imp roves the fixability of the predetermined ink" have levels of permeability higher than the predetermined one.

By way of example, the predetermined ink having the predetermined level of permeability is a black ink. A plurality of color inks having the levels of permeability higher than the predetermined one may be cyan (C), magenta (M), and yellow (Y) color inks.

When the black ink with a low-permeability black ink and the high-permeability color inks are printed in a black image area so that the inks overlap, a speed at which the black ink is fixed is increased. This suppresses the occurrence of smear.

The level of permeability can be adjusted by varying the content of a surface active agent represented by acetylenol (a trade name of Kawasaki Fine Chemicals Co., Ltd.; obtained by adding ethylene oxide to acetylene glycol and represented as ethylene oxide-2, 4, 7, 9-tetramethyl-5-decyne-4, 7-diol). The permeability can be improved by increasing the content of the surface active agent. Accordingly, in the present example, the "plurality of color inks" have a higher content of surface active agent than the "predetermined ink". As a kind of the surface active agent made to contain, an anionic surface active agent, a cationic surface active agent, or a nonionic surface agent or the like which are well-known are applicable. Particularly, the nonionic surface agent such as above-mentioned acetylenol is preferable.

In another example of the first aspect, the predetermined ink having the predetermined level of permeability may be a red (R) ink, while the plurality of color inks having the levels of permeability higher than the predetermined one may be a magenta (M) and yellow (Y) color inks. This makes it possible to suppress the occurrence of smear associated with the red ink.

According to the second aspect, the "color ink having the levels of permeability higher than the predetermined one" contains a component that coagulates the color material of the predetermined ink.

By way of example, the "predetermined ink" may be the black ink, while the "plurality of color inks including the ink(s) which improves the fixability of the predetermined ink" may be the cyan, magenta, and yellow color inks in which only the cyan ink contains a component that coagulates the color material of the black ink.

In another example, the "predetermined ink" may be the black ink, while the "plurality of color ink including the ink(s) which improves the fixability of the predetermined ink" may be the cyan, magenta, and yellow color inks all of which contain the component that coagulates the color material of the black ink.

When the black ink and the plurality of color inks including one (for example, the cyan ink) having a component that insolubilizes or coagulates the black ink are thus printed in a black image area so that the inks overlap, a solid-liquid separation of the color material and a solvent in the black ink is promoted, and then, a unnecessary solvent component permeate the print medium promptly. The black ink is thus readily fixed to the print medium. Therefore, the occurrence of bleeding or smear can be suppressed.

In another example, the "predetermined ink" may be the red ink, while the "plurality of color inks including the ink(s) which improves the fixability of the predetermined ink" may be the magenta and yellow color inks at least one of which contains a component that coagulates the color material of the red ink.

The component that coagulates the color material of the predetermined ink is suitably a polyvalent metal salt. The polyvalent metal salt is composed of divalent or higher polyvalent metal ions and negative ions that couple to the polyvalent metal ions. Specific examples of the polyvalent metal ions include divalent metal ions such as $Ca^{2+}$, $Cu^{2+}$, $Ni^{2+}$, $Mg^{2+}$, and $Zn^{2+}$ and trivalent metal ions such as $Fe^{3+}$ and $Al^{3+}$. Further, specific examples of negative ions include $Cl^-$, $NO_3^-$, $SO_4^{2-}$, and the like.

A third aspect is a combination of the first and second embodiments. Specifically, the third aspect uses the predetermined ink having the predetermined level of permeability and the plurality of color inks which have the levels of permeability higher than the predetermined one and which include one containing the component that coagulates the color material of the predetermined ink.

Print Data Creating Method

Figure 5:
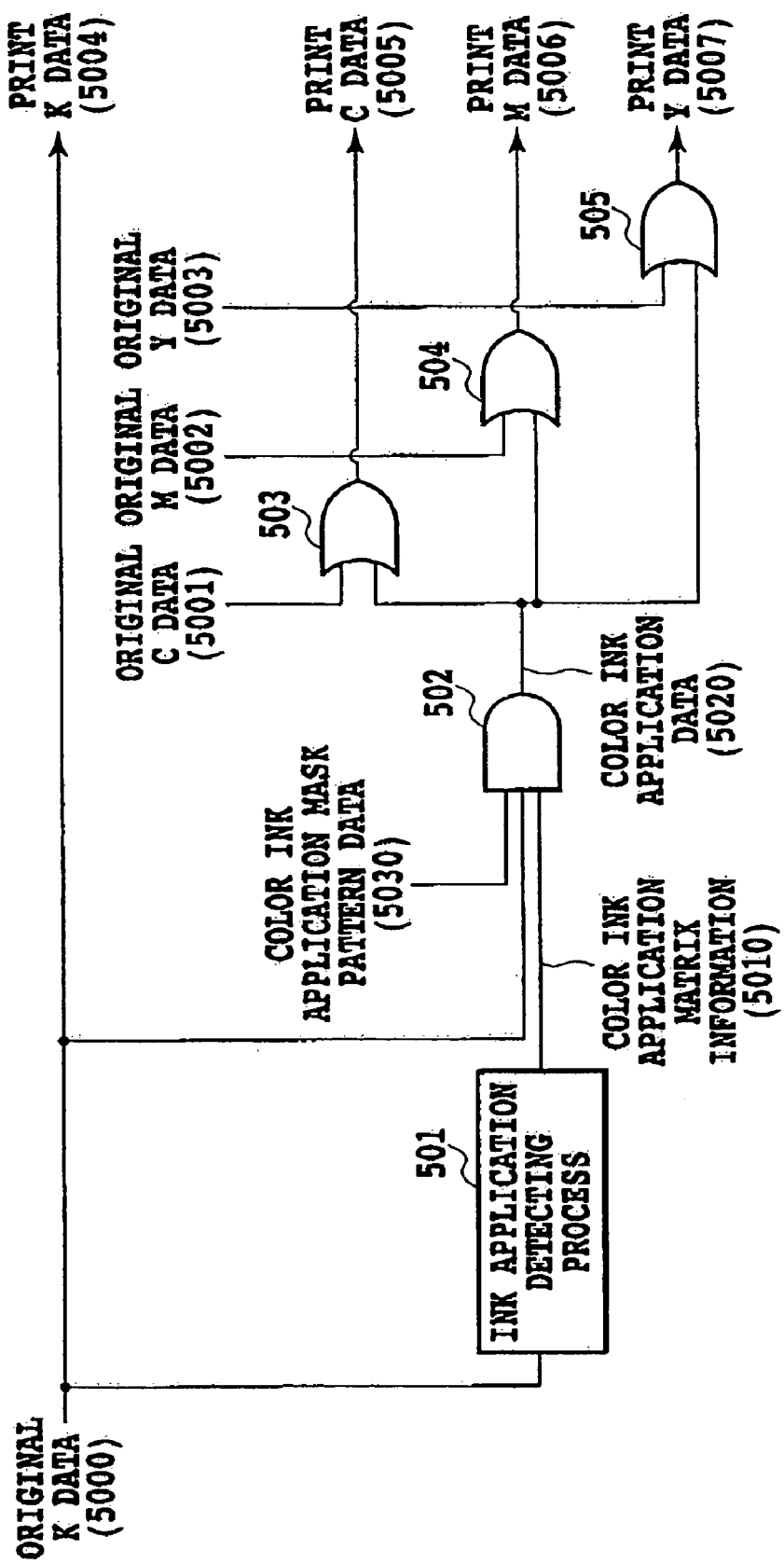
FIG. 5 is a block diagram illustrating creation of print data according to the embodiment of the present invention.

FIG. 5 is a block diagram illustrating creation of print data according to the present embodiment.

According to the present embodiment, an ink application detecting process 501 creates color ink application matrix information 5010 indicating pixel areas to which color inks are to be applied in order to suppress smear and/or bleeding, on the basis of original black (K) data 5000 (binary image data on black). Then, an AND gate 502 computes the logical AND of the color ink application matrix information 5010 created, original K data, and color ink application mask pattern data 5030 to create color ink application data 5020. Then, the logical OR of the color ink application data and original data on C, M, and Y (binary image data on the colors) is computed by OR gates corresponding to the respective colors (503 for C, 504 for M, and 505 for Y) to create print data corresponding to the respective colors.

Here, for a predetermined pixel area (also referred to as a "focused matrix" in the specification) in original K data, the color ink application matrix information 5010 indicates the result of determination, in accordance with a predetermined criterion, as to whether or not to apply the color inks to the focused matrix. The color ink application matrix information 5010 is one-bit data. Specifically, if the color inks need to be applied to the focused matrix, the data indicates "1". If the color inks need not to be applied to the focused matrix, the data indicates "0".

Figure 6:
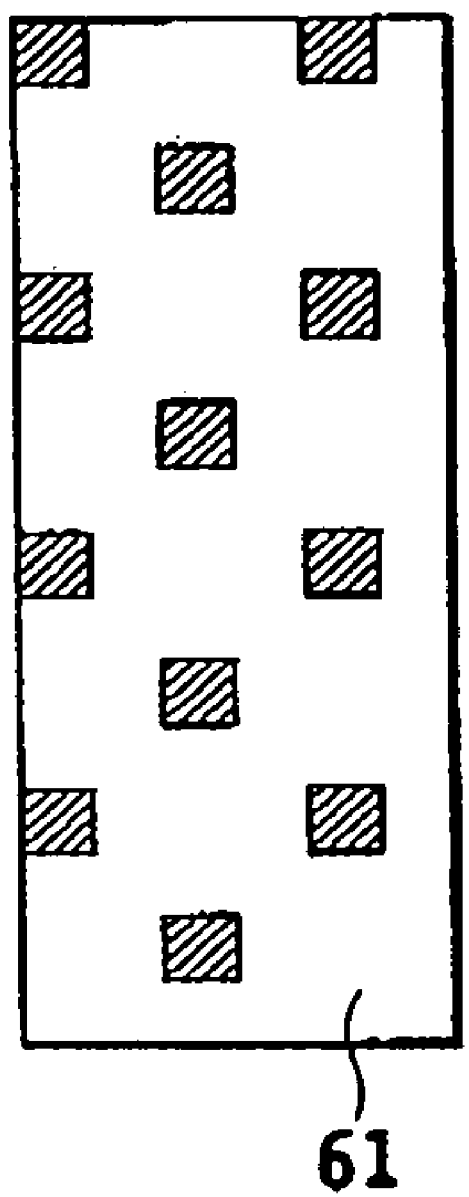
FIG. 6 is a diagram showing an example of ink application mask pattern data according to the embodiment of the present invention.

Further, color ink application mask pattern data 5030 is a pattern that defines a dot arrangement of color inks ejected by an overlapping manner to a black image area as shown in FIG. 6 (see a pattern in FIG. 6). To generate color ink application data 5020 indicating the arrangement of the color inks to be actually added to the black image area, the color ink application mask pattern data 5030 is subjected to an AND process together with the original black (K) data 5000 and the color ink application matrix information 5010.

Reference numeral 61 in FIG. 6 denotes the color ink application mask pattern data 5030 in detail. In the figure, the color ink application mask pattern data is composed of 6 (pixels)×16 (pixels). In the figure, a white part of the mask pattern shown at reference numeral 61 is a masked portion (non-printed pixels). The pixels in the masked portion do not permit ejection of the inks. On the other hand, painted parts correspond to pixels that permit ejection of the inks (printed pixels or simply dots).

According to the present embodiment, the duty of a print pixel defined by the color ink application mask pattern data is provisionally set at 12.5%. The duty corresponds to the amount of color ink dots applied to a print area of the color ink application matrix 5010 determined to require ink application in order to suppress smear and/or bleeding. The amount of ink dots applied and the size of the mask can be set in accordance with the characteristics of the inks or the configuration of the printing apparatus. The dots in the mask may be arranged regularly or falsely randomly. The color ink application data 5020 is obtained by computing the logical AND of the color ink application matrix information 5010, the color ink application mask pattern data 5030, and the original K data 5000. The color ink application data 5020 is information indicating the arrangement of the color dots applied to a black image area.

When color ink application data 5020 is created, the logical AND with the original K data 5000 is computed by repeatedly using the data in the vertical and horizontal directions, the original K data being present in a matrix which is detected by the color ink application detecting process 501 as an area requiring color ink application and for which the color ink application matrix information 5010 is set to "1".

Now, detailed description will be given of the flow of data during creation of print C data 5005, print M data 5006, and print Y data 5007 based on the original K data 5000.

When the original K data, which is binary data, is transmitted to the color ink application detecting process 501, the color ink application detecting process 501 determines whether or not to apply the color inks to the focused matrix (for example, 64 (pixels)×32 (pixels)) to suppress smear and/or bleeding on the basis of the original data in accordance with a predetermined criterion. When the focused matrix is determined to require ink application, the color ink application matrix information 5010 is set to "1" for all the pixels within the focused matrix determined to require ink application. When the focused matrix is determined not to require ink application, the color ink application matrix information 5010 is set to "0" for all the pixels.

For the determination based on the predetermined criterion, if for example, the rate of the original K data in the focused matrix, that is to say, the rate of pixels to which the black ink is applied of pixels constituting the focused matrix, is higher than a predetermined one (for example, 30%), the color ink application matrix information 5010 is set to "1". If the rate is lower than the predetermined one, the color ink application matrix information 5010 is set to "0".

Further, the size of the focused matrix (64 (pixels)×32 (pixels)) is only an example. Any size may be used provided that it is within a predetermined range within which the ink application detecting process 501 can be appropriately executed.

The color ink application matrix information 5010 thus created, color ink application mask pattern data 5030, and original K data 5000 are input to the AND data 502. The logical AND of the data is then computed to create color ink application data 5020.

By thus computing the logical AND of the data, it is possible to avoid applying the color inks to pixels to which the black ink is not applied in a focused matrix determined by the color ink application detecting process 501 to require color ink application. In other words, it is possible to create such color ink application data 5020 as applies the color inks only to areas to which the black ink is actually applied.

Then, C, M, and Y print data are created on the basis of the color ink application data 5020.

Specifically, the color ink application data 5020 and original C data 5001 are input to the OR gate to compute their logical OR to create print C data 5005. By thus creating the logical OR of the data, it is possible to create print C data 5005 reflecting both the arrangement of dots based on the original C data 5001 and the arrangement of dots of the color ink (in this case, C) applied to the image area of black.

Similarly, the ink application data 5020 and original M data 5002 are input to the OR gate 504 to compute their logical OR. The ink application data 5020 and original Y data 5003 are input to the OR gate 505 to compute their logical OR. Thus, print M data 5006 and print Y data 5007 are created.

The original K data 5000 is used as print K data 5004 as it is.

The print data on each color thus obtained is transmitted to the ink jet printing apparatus. The ink jet printing apparatus then performs a printing operation.

Figure 7:
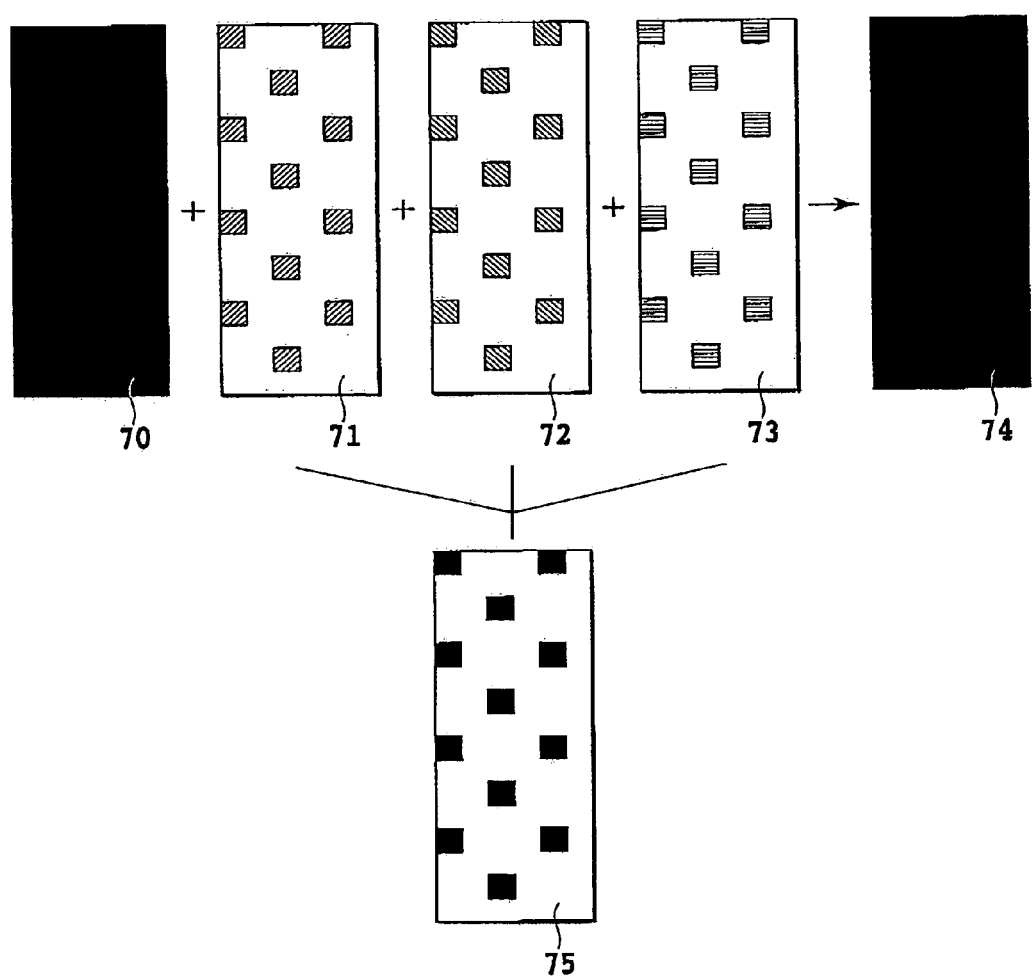
FIG. 7 is a schematic diagram showing the results of printing of print data on each color created on the basis of a solid black image determined to require ink application.

FIG. 7 is a schematic diagram showing the results of printing of print data (5005, 5006, and 5007) on the respective colors created on the basis of a solid black image determined by the color ink application determining process 501 to require ink application.

The term "solid black image" as used in the specification indicates a state in which the black dots are printed to a print area which is a focused object at a duty of 100%. In other words, the term "solid black image" indicates a state in which the black dots are applied to all of pixels constituting the focused matrix.

The solid black image is obtained by applying the black ink and each color inks which are ejected by overlapping manner using the print K data 5004, shown at reference numeral 70 in FIG. 7, the print C data 5005, shown at reference numeral 71, the print M data 5006, shown at reference numeral 72, and the print Y data 5007, shown at reference numeral 73. That is, a black image shown by reference numeral 74 is printed.

Since the synthesis of the C, M, and Y inks results in process black having a color similar to black, the synthesis of the data shown by reference numerals 71, 72, and 73 results in process black data shown by reference numeral 75. Accordingly, even when the color inks overlap the solid black image, the dots are process black. Thus, the occurrence of smear and/or bleeding can be suppressed without making the colors of the color inks outstanding or degrading the uniformity of black.

Moreover, the density of the black image can be increased by laying, on top of the black ink, the process black ink obtained by synthesizing the C, M, and Y inks together.

Further, the print data on the color inks are created on the basis of the color ink application data 5020. Accordingly, even if an image which should be formed is not the solid black image which consists of only pixels to which the black ink is applied as shown in FIG. 7 but a black image including pixels to which the black ink is not applied, it is possible to apply the color inks only to pixels applied the black ink in the black image. Moreover, the overlapping colors constitute process black to inhibit the degradation of black images.

According to the present embodiment, the original data on C, M, and Y are binary data. However, the original data may be multivalued data.

FIGS. 8A and 8B are a diagram illustrating logical calculation process executed on the original data (5001, 5002, 5003) on the colors C, M, and Y in a 2-bit index form (multivalted) and the color ink application data (5020) according to the embodiment of the present invention.

FIG. 8A shows an example of dot expansion of the 2-bit color index data during printing. An expansion pattern is set for each of the 2-bit index data (00, 01, 10, 11).

The dot expansion during printing can be carried out in conformity with the resolution of the print head.

Any index expansion pattern may be used provided that it can express four gray levels.

FIG. 8B shows an arithmetic process (503 to 505) executed on 2-bit original color index data and 1-bit color ink application data.

If the color ink application data is 1, the print data is converted into 01 after an arithmetic operation only if the color index data is 00. For the other color index data, no color inks need be newly added to the black image area. Accordingly, the values 01 to 11 may be used as print data as they are.

In the description of FIGS. 8A and 8B, the original data on the color inks are 2-bit multivalued index data. However, the present invention is not limited to this. Any multivalued data may be used. Importantly, even for a black image area to which no color inks are applied simply by using the original data on the color inks, if this area requires the application of the color inks in order to suppress smear or bleeding, the color inks are newly added to this area.

As described above, according to the present embodiment, if a plurality of color inks are applied to a black image area in order to suppress the occurrence of smear and/or bleeding, the same color ink application mask pattern is used for each color to create print data on each color ink on the basis of the original K data. Thus, the color inks applied to a black image area are placed at the same position. Consequently, the color inks overlapping in the black image area constitute process black. The tint of the color inks newly added in order to suppress smear and/or bleeding is not outstanding. This makes it possible to inhibit the degradation of black images.

Further, all the color inks applied to a black image area constitutes process black. Accordingly, it is also possible to suppress the generation of black images having the tint of the color inks formed in that area. This makes it possible to improve the grade of images.

Of course, since during printing, high-permeability color inks are added to a low-permeability black ink or a color ink containing a component for coagulating the black ink is applied to the black ink, the occurrence of smear and bleeding can be suppressed. This makes it possible to reduce the time required to fix the black ink to the print medium.

Second Embodiment

The ink configuration that can be used in the present embodiment includes the above first to third aspects as in the case of the first embodiment. In particular, according to the present embodiment, the black ink is used as the predetermined ink having the predetermined level of permeability. The cyan (C), magenta (M), and yellow (Y) color inks are used as the plurality of inks having the levels of permeability higher than the predetermined one. Moreover, the cyan ink contains a component that coagulates the color material of the black ink.

Print Data Creating Method

Figure 9:
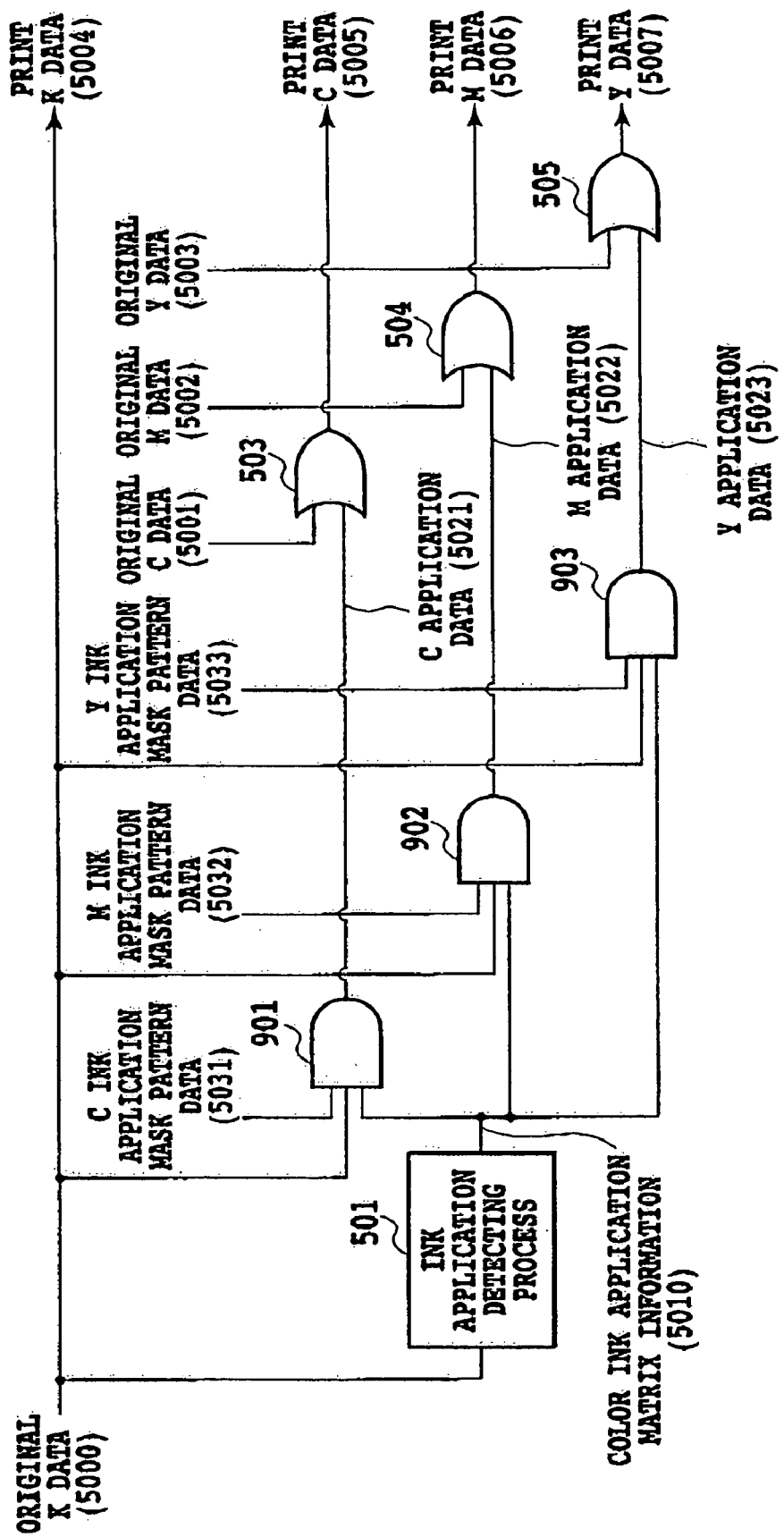
FIG. 9 is a block diagram illustrating creating of print data according to the embodiment of the present invention.

FIG. 9 is a block diagram illustrating creating of print data according to the present embodiment of the present invention.

In the present embodiment, parts of each element and data which are similar to those in the first embodiment are shown at the same reference numerals and their description is omitted. Only parts characteristic of the present embodiment will be described. According to the present embodiment, the ink application detecting process 501 creates color ink application matrix information 5010 on the basis of the original black (K) data (binary image data) 5000. Then, color ink application matrix information 5010, color ink application mask pattern data (5031 to 5033) provided for the colors C, M, and Y and defining the dot arrangement of the color inks ejected by overlapping manner to a black image area, and the original K data (5000) are input to AND gates 901, 902, and 903 to compute the logical AND of these data to create color ink application data on each color ink (5021 to 5023). Then, the color ink application data created (5021 to 5023) and the C, M, and Y color original data (5001 to 5003) are input to the OR gates 503, 504, and 505 to compute the logical OR of these data to create print data on each color ink (5005 to 5007).

The original K data 5000 constitutes the print K data 5004 as it is.

As described above, according to the present embodiment, the color ink application mask pattern is provided for each color ink, and these mask patterns are used to create color ink application data for each color ink. The color ink application mask patterns provided for the respective color inks have different dot arrangements as shown in FIG. 10.

Figure 10:
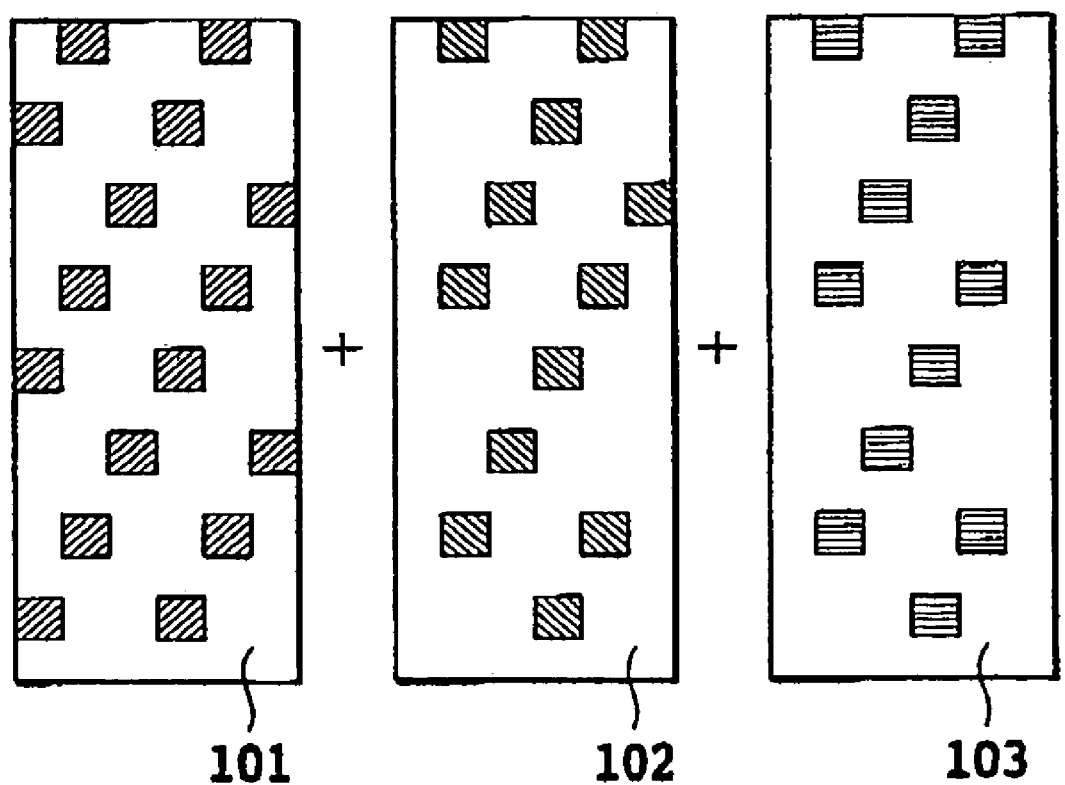
FIG. 10 is a diagram showing an example of ink application mask pattern data on each color according to the embodiment of the present invention.

In FIG. 10, reference numeral 101 denotes the color ink application mask pattern data 5031 or the C ink in detail. Reference numeral 102 denotes the color ink application mask pattern data 5032 on the M ink in detail. Reference numeral 103 denotes the color ink application mask pattern data 5033 on the Y ink in detail.

The color ink application mask pattern data has a size of 6 (pixels)×16 (pixels). In FIG. 10, white parts of the mask patterns shown at reference numerals 101, 102, and 103 correspond to masked portions (non-printed pixels) and contain pixels that do not permit ejection of the inks. On the other hand, painted parts correspond to pixels that permit ejection of the inks (printed pixels or simply dots). The logical AND with the original K data 5000 is computed by repeatedly using the data in the vertical and horizontal directions, the original K data being present in a matrix which is detected by the color ink application detecting process 501 as an area requiring color ink application and for which the color ink application matrix information 501 is set to "1".

Figure 4:
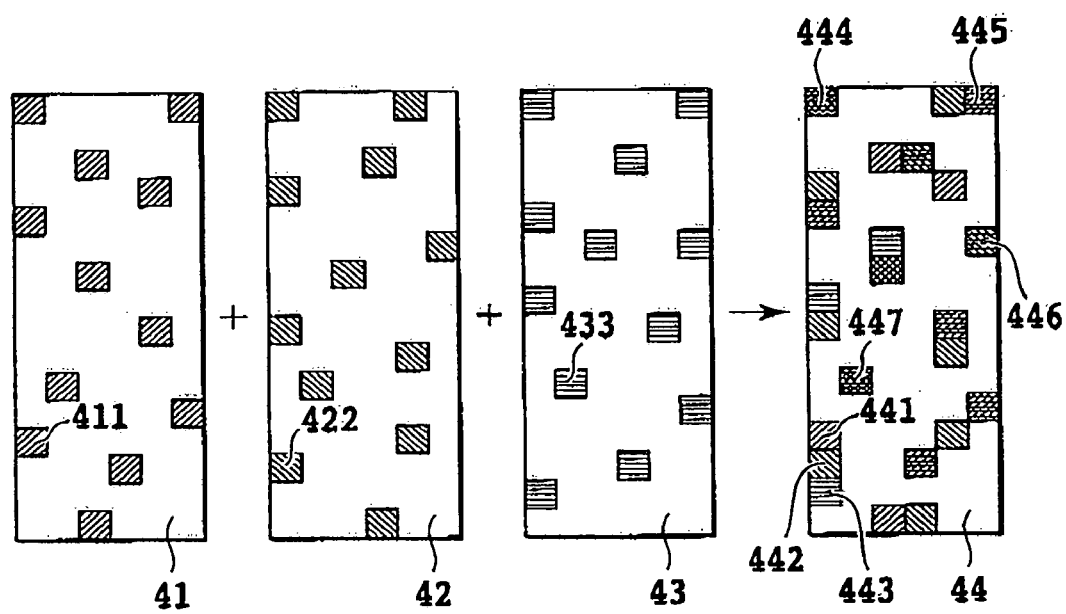
FIG. 4 is a diagram illustrating a conventional printing method in which color inks overlap a black ink.

The arrangement of dots in the color ink application mask pattern for each color (5031, 5032, and 5033) is such that in the dot arrangement formed when the mask patterns for the respective colors are laid on top of one another, the rate at which the all dot arrangements of the C, M, and Y inks overlap, that is, the rate of the entire image which is taken up by areas of process black, is higher than that of non-process-black areas. When the process black area is thus predominant, even if the color ink overlapping portion spreads out from a black image area, the probability of perceiving the overlapping portion can be reduced compared to conventional techniques such as the one shown in FIG. 4. As a result, it is possible to suppress a variation in the tint of black ink images.

Further, in the example in FIG. 10, non-process black areas are formed though the number of them is small. The formation of non-process-black areas has the advantage of reducing the amount of color inks impacting the print medium, the color inks being intended to eject by overlapping manner. If it is critical to minimize a variation in the tint of black image areas, all the color ink overlapping portions are preferably process black areas as described in the first embodiment. However, in this case, the three color inks C, M, and Y invariably overlap. This increases the amount of inks impacting the print medium. If a large amount of ink impacts the print medium, a problem such as cockling or ink overflow may occur. Thus, according to the present embodiment, the dot arrangements of the C, M, and Y color ink application mask patterns are configured as shown in FIG. 10 in order to reduce the amount of color inks impacting the print medium, the color inks being intended to eject by overlapping manner (the color inks being intended to overlap), while maintaining the tint of black image areas.

Moreover, in the example in FIG. 10, of the C, M, and Y inks overlapping in a black image area, the C ink, which reacts with the black ink, has the largest number of dots arranged. This causes the black ink to be instantaneously coagulated. Accordingly, smearing with the black ink can be effectively suppressed compared to the case in which a larger number of M or Y dots are arranged.

Further, the dot arrangement of the mask pattern for each color shown in FIG. 10 is such that dot areas formed when the mask patterns for the respective colors are laid on top of one another are not adjacent to one another. With this arrangement, when dots formed when the color inks are applied to a black image are not adjacent to one another. This makes it possible to inhibit a color ink spread phenomenon in which adjacent dots merged together and in which the merged dots then shift from an impacting position.

Further, according to the present embodiment, each of the C, M, and Y color ink application mask patterns has a size of 6 (pixels)×16 (pixels). However, the present invention is not limited to this. Any size may be used provided that it is within a predetermined range within which the color ink application matrix information 5010 can be appropriately masked. Furthermore, according to the present embodiment, the duty of print pixels defined by the color ink application mask pattern data is not particularly limited. The duty can be set within an appropriate predetermined range for the color ink application mask pattern for each color.

Figure 11:
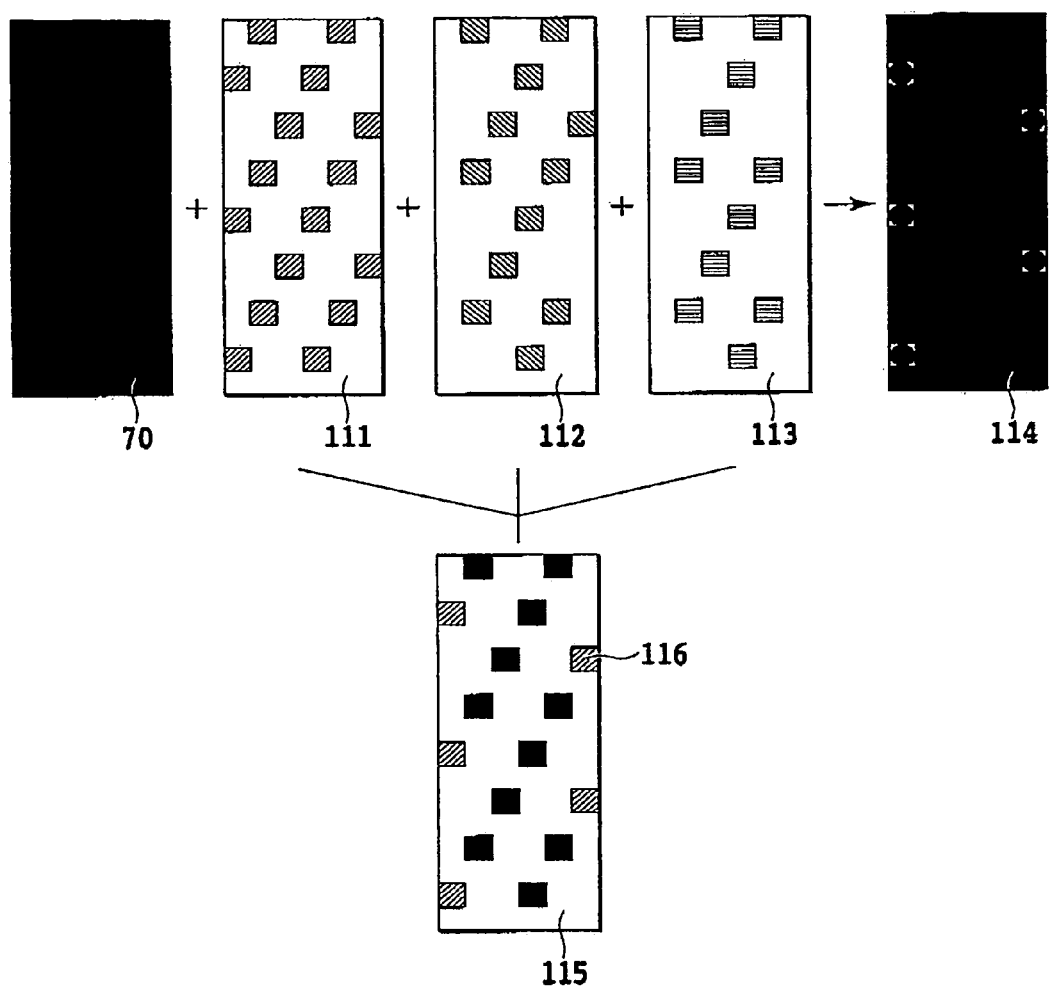
FIG. 11 is a schematic diagram illustrating the results of printing by using print data on each color which is created from ink application matrix patterns on the colors, based on solid black data determined to require ink application.

FIG. 11 is a schematic diagram illustrating the results of printing of print data on each color (5005 to 5007) which is created from the ink application matrix patterns shown at reference numerals 101, 102, and 103 in FIG. 10, the printing being based on black data constituting solid black data determined by the color ink application determining process 501 to require ink application.

The solid black image is obtained by applying the black ink and each color inks which are ejected by overlapping manner using the print K data 5004, shown at reference numeral 70 in FIG. 11, the print C data 5005, shown at reference numeral 111, the print M data 5006, shown at reference numeral 112, and the print Y data 5007, shown at reference numeral 113. That is, a black image shown by reference numeral 114 is printed.

In an output image, the tint of dots (for example, reference numeral 116) that are not process black in spite of the synthesis of reference numerals 111, 112, and 113 is slightly outstanding at reference numeral 114 denoting a dot scale. However, it cannot be identified on a print medium scale, that is, visually.

This is because the color ink application mask pattern for each color is set so that the C, M, and Y dot arrangements are matched as much as possible, that is, so that the rate of the entire image which is taken up by process black areas is higher than that of non-process-black areas.

The present embodiment is effective in the following cases. Although the synthesis of the C, M, and Y inks results in process black approximate to black, the print medium does not adequately absorb ink and when a large amount of ink impacts the print medium, the ink cannot permeate instantaneously through the print medium and overflow the periphery of the print surface; process black more approximate to black is obtained by mixing the C, M, and Y inks in a particular amount ratio rather than mixing equal amounts of these inks together.

In this case, the data 111, 112, and 113 are synthesized together to obtain the process black data shown in FIG. 15. As a result, the color inks overlapping on one another on the solid black image are not outstanding and do not degrade the uniformity of the black color. Consequently, the occurrence of smear and/or bleeding can be suppressed.

According to the present embodiment, the original data on C, M, and Y are binary. However, these data may be multivalued. The multivalued data is similar to that described in the first embodiment. Accordingly, its detailed description is omitted.

As described above, the present embodiment can produce effects similar to those of the first embodiment. Moreover, not all the dots formed by the color inks ejected by overlapping manner in the black image area constitute process black. This makes it possible to reduce the amount of ink impacting the same position. The present embodiment is thus effective on print media that do not adequately absorb ink.

Third Embodiment

In the description of the first and second embodiments, the original K data is binary. According to the present embodiment, the original K data is in an index form (multivalued). The data is expanded in accordance with the resolution of the print head during printing.

For the print data creating method and the applicable ink configuration, the present embodiment may be the same as either the first or second embodiment.

FIGS. 12A, 12B, and 12C are a diagram illustrating a logical calculation for creating print data on each color (5005 to 5007) from the original data on C, M, and Y (5001, 5002, and 5003) and the color ink application data (5020 or 5021 to 5023) according to the embodiment of the present invention.

FIG. 12A shows an example of dot expansion of 2-bit color index data during printing according to the present embodiment. An expansion pattern is set for each of the 2-bit index data (00, 01, 10, 11).

The dot expansion during printing can be carried out in conformity with the resolution of the print head.

Any index expansion pattern may be used provided that it can express four gray levels.

FIG. 12B shows an example of dot expansion of 2-bit black index data during printing according to the present embodiment. An expansion pattern is set for each of the 2-bit index data (00, 01, 10, 11).

Print data on each color is created on the basis of original K data in this 2-bit index form.

As in the case of the first or second embodiment, shown in FIG. 5 or 9, when the original K data 5000 in the 2-bit index form is transmitted to the color ink application detecting process 501, the color ink application detecting process 501 determines whether or not to apply the color inks to the focused matrix (for example, 64 (pixels)×32 (pixels)) to suppress smear and/or bleeding on the basis of the original data in accordance with a predetermined criterion. When the focused matrix is determined not to require ink application, the color ink application matrix information 5010 is set to "0". If the color ink application detecting process 501 determines that the color inks are to be applied, then the present embodiment further checks index data for each pixel. Then, "0" is set for a pixel with the 2-bit index data (00, 01), whereas "1" is set for a pixel with the 2-bit index data (10, 11). Therefore, in this case, the color ink application matrix information 5010 may contain a mixture of "1" and "0".

According to the present embodiment, the color ink application detecting process 501 determines whether or not the focused matrix contains a predetermined number of black pixels. If the color ink application detecting process 501 determines the focused matrix does not contain the predetermined number of black pixels, all of pixels within the focused matrix are set to "0". If the color ink application detecting process 501 determines the focused matrix contain the predetermined number of black pixels, it further determines whether or not the index data for each pixel has a plurality of index values equal to or smaller than a predetermined value. If the index data checked has an index value larger than the predetermined one, that pixel is set to "1". If the index data checked has an index value equal to or smaller than the predetermined one, that pixel is set to "0". Color ink application matrix information is thus created.

According to the present embodiment, the data with the index value equal to or smaller than the predetermined one is (10, 11). However, the present invention is not limited to this. The 2-bit index data (11) alone or (01, 10, 11) may be used in place of (10, 11).

Further, according to the present embodiment, the original K data is 2-bit index data. However, the present invention is not limited to this. Any multivalued data may be used provided that it can be appropriately expanded.

Moreover, according to the present embodiment, the color ink application detecting process 501 need not make determinations for each pixel as described above.

The color ink application matrix information 5010 thus created is input to the AND gate (in FIG. 5, reference numeral 502; in FIG. 9, reference numerals 901 to 903) to compute the logical AND of the multivalued original K data 5000 and the color ink application mask pattern data (in FIG. 5, reference numeral 5030; in FIG. 9, reference numerals 5031 to 5033). Color ink application data (in FIG. 5, reference numeral 5020; in FIG. 9, reference numerals 5021 to 5023) is then created from the logical AND.

Then, the color ink application data created (in FIG. 5, reference numeral 5020; in FIG. 9, reference numerals 5021 to 5023) is input to the OR gates 503 to 505 to compute the logical OR of the color ink application data and the original data on each color 5001 to 5003. Thus, print data on each color 5005 to 5007 is created.

The original K data 5000 constitutes the print K data 5004 as it is.

FIG. 12C shows an arithmetic process (reference numerals 503 to 505) executed on 2-bit original color index data and 1-bit ink application data.

If the color ink application data is 1, the calculated print data is converted into 10 if the color index data is 00 or 01. For other color index data, no color inks are newly added to the black image area. Accordingly, the value 10, 11 is used as print data as it is.

According to the present embodiment, the original data on the color inks are 2-bit multivalued index data. However, the present invention is not limited to this. Any multivalued data may be used. Importantly, even for a black image area to which no color inks are applied simply by using the original data on the color inks, if this area requires the application of the color inks, the color inks are newly added to this area.

Figure 13:
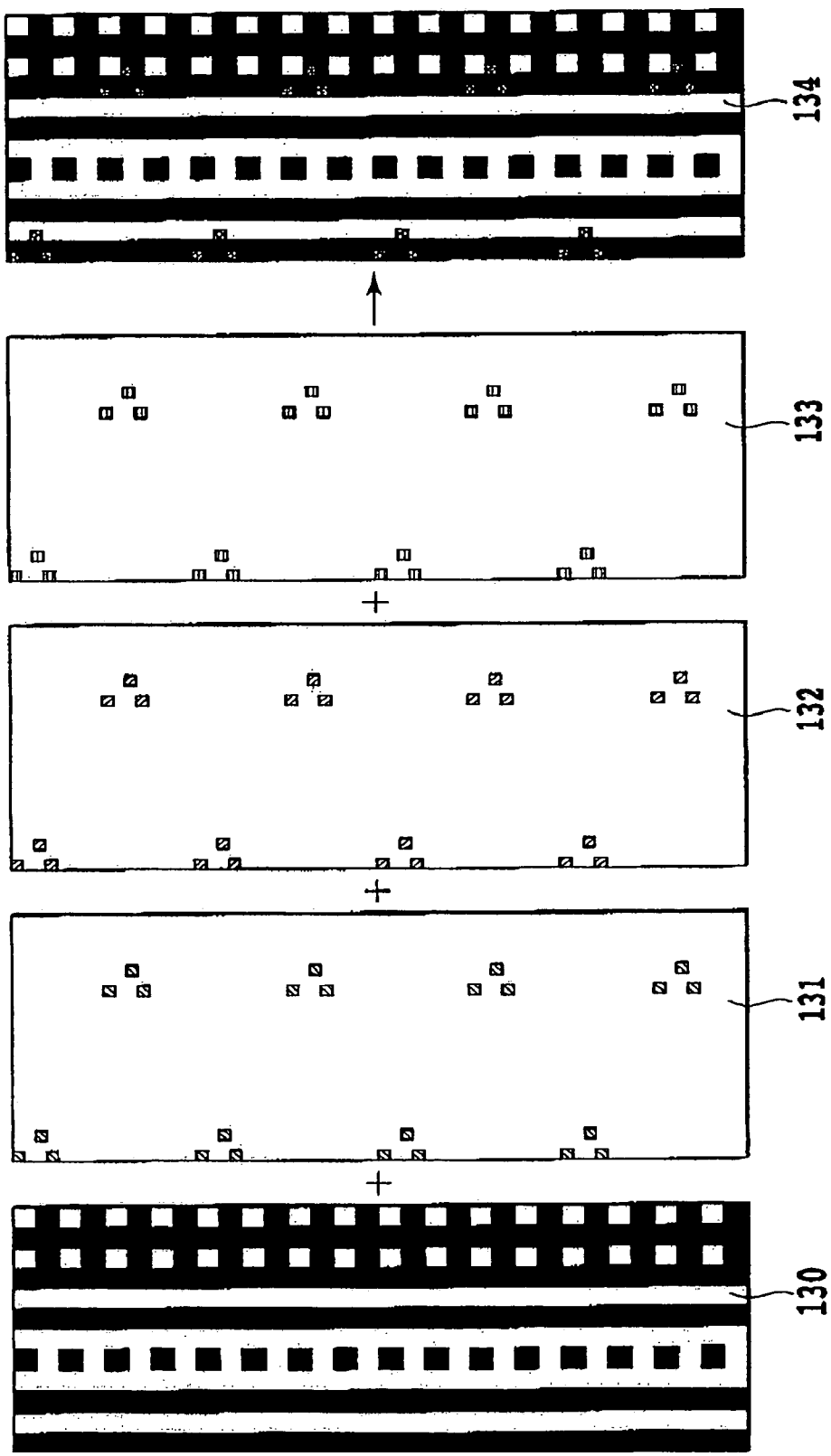
FIG. 13 is a schematic diagram illustrating the results of printing carried out by using an ink application matrix pattern to apply ink to a black image determined to require ink application.

FIG. 13 is a schematic diagram illustrating the results of printing carried out by using the ink application matrix patterns shown at reference numeral 61 in FIG. 6 to apply the color inks to a black image determined by the color ink application determining process 501 to require the application of the color inks.

For example, if the print K data 5004 on the black image is as shown at reference numeral 130 in FIG. 13, each color ink are ejected by overlapping manner using the print C data 5005, shown at reference numeral 131, the print M data 5006, shown at reference numeral 132, and the print Y data 5007, shown at reference numeral 133. A black image shown at reference numeral 134 is thus printed.

In FIG. 13, the 2-bit index data (01) at reference numeral 130 is set to "0" in the color ink application matrix information 5010, created by the color ink application detecting process 501. This indicates that no color inks are applied to the corresponding pixels in reference numerals 131 to 133.

However, according to the present embodiment, the color inks may be ejected by overlapping manner to an area to which the black ink is not applied. In this case, it is possible to avoid making the tint of the color inks outstanding by arranging the ink application mask patterns so that the C, M, and Y color inks overlap so as to for process black.

According to the present embodiment, the black ink may need to be decimated from a solid black image on a print medium that does not adequately absorb ink, owing to limitations on the amount of black ink impacting the print medium. In this case, by ejecting the color inks by overlapping manner so as to form process black when the color inks are applied to the solid black image, it is possible to suppress the occurrence of smear and/or bleeding without making the colors of the color inks outstanding or degrading the uniformity of black. Moreover, the density of the black image can be increased.

As described above, according to the present embodiment, when data of the color inks (color ink application data) to be newly added to a black image area is generated, multivalued black data is utilized. Consequently, compared to the first and second embodiments, which utilize binary black data, it is possible to reduce loads associated with a process of generating color ink application data.

Other Embodiments

In the description of the above embodiments, the host 100 creates print data according to the present invention. However, the present is not limited to this. An ink jet printing apparatus may be used to create print data.

In this case, when the host 100, which is a source of image data, transmits image data to the control section 20 via the interface 21, the control section 20 creates print data according to the present invention. If image data transmitted by the host 100 is not subjected to image processing such as color processing or quantization, then before creating print data according to the present invention, the control section 20 may execute desired image processing on the image data.

In the description of the above embodiments, the black, magenta, yellow, and cyan inks are used. The inks used are not limited to these. For example, it is possible to use any of other color inks in red (R), skin color (S), blue (B), green (G), light cyan, light magenta, and the like, or their combination. In this case, the three color inks in cyan, magenta, and yellow may be used as the color inks overlapping on the black ink as in the above embodiments. However, the process black may be formed by adding any of the other color inks in red (R), skin color (S), blue (B), green (G), light cyan, light magenta, and the like to these three color inks.

Further, according to the present invention, the predetermined ink having a low fixability (for example, the black ink) and the plurality of color inks that improve the fixability of the predetermined ink (for example, cyan, magenta, and yellow) may be applied to the print medium in an arbitrary order.

Furthermore, the present invention is also realized by storing, in a storage medium, program codes that create print data described in the above embodiments and causing a computer (or the CPU 10 or an MPU) in the host 100 or ink jet printing apparatus 200 to read the program codes stored in the storage medium.

In this case, the program codes themselves read from the storage medium implement the functions of the above embodiments. The storage medium storing the program codes constitute the present invention.

The storage medium supplying the program codes may be, for example, a floppy (traded mark) disk, a hard disk, an optical disk, a magneto-optic disk, a CD-ROM, a CD-R, a magnetic tape, a nonvolatile memory card, or a ROM.

The functions of the above embodiments may be implemented not only by causing the computer to execute the read program codes but also by causing an OS (Operating System) operating on the computer to execute a part or all of the actual process on the basis of instructions from the program codes.

The functions of the above embodiments may also be implemented by writing the program codes read from the storage medium to a memory provided in an expanded board inserted into the computer or an expanded unit connected to the computer, and then causing a CPU or the like provided in the expanded board or unit to execute a part or all of the actual process on the basis of the instructions from the program codes.

The present invention has been described in detail with respect to preferred embodiments, and it will now be apparent from the foregoing to those skilled in the art that changes and modifications may be made without departing from the invention in its broader aspect, and it is the invention, therefore, in the apparent claims to cover all such changes and modifications as fall within the true spirits of the invention.

This application claims priority from Japanese Patent Application No. 2004-063072 filed Mar. 5, 2004, which is hereby incorporated by reference herein.

What is claimed is:

1. A data creating method for creating image data corresponding to each of a plurality of color inks applied to a black image area formed on the basis of image data on a black ink, the plurality of color inks being a cyan ink, a magenta ink, and a yellow ink, the method comprising:

an image data creating step of creating image data corresponding to each of the plurality of color inks on the basis of the image data on the black ink, wherein the image data creating step creates the image data on each of the plurality of color inks so that the rate of areas in which all the plurality of color inks are applied, in the black image area, is higher than that of areas to which only some of the plurality of color inks are applied, and wherein at least one of the cyan ink, the magenta ink, and the yellow ink contains a component that coagulates a color material of the black ink.

2. The data creating method according to claim 1, further comprising an ink application determining step of determining whether or not it is necessary to apply the plurality of color inks to the black image area, wherein the image data creating step creates image data corresponding to each of the plurality of color inks only when the determining step determines that it is necessary to apply the plurality of color inks.

3. The data creating method according to claim 2, wherein the image data on the black ink is in an index form, and when the determining step determines that it is necessary to apply the plurality of color inks, the ink application determining step determines whether or not each index data in the black image area is a plurality of index values equal to or smaller than a predetermined one.

4. The data creating method according to claim 1, wherein the cyan ink, the magenta ink, and the yellow ink have higher permeability than the black ink.

5. An ink jet printing apparatus comprising:

a print head that ejects at least the black ink and the plurality of color inks;

a data creating portion that executes the data creating method according to claim 1; and a print controller that controls the print head such that inks are ejected from the print head on the basis of a print data created by the data creating portion.

6. The ink jet printing apparatus according to claim 5, wherein the print head ejects inks which are a different type from the black ink and the plurality of color inks.

7. The ink jet printing apparatus according to claim 6, wherein the different types of inks are at least one type selected from a group of a light cyan ink, a light magenta ink, a red ink, a green ink, and a blue ink.

8. A computer-readable medium encoded with a computer program for causing a computer to execute the data creating method according to claim 1.

9. A data creating method for creating image data corresponding to each of a plurality of color inks applied to an image area formed on the basis of image data on a predetermined ink, the plurality of color inks being different from the predetermined ink, at least one color ink of the plurality of color inks having at least one of a first characteristic that improves permeability of the predetermined ink and a second characteristic that coagulates a color material in the predetermined ink, the method comprising:

an image data creating step of creating image data corresponding to each of the plurality of color inks on the basis of the image data on the predetermined ink, wherein the image data creating step creates the image data on each of the plurality of color inks so that the rate of areas in which all the plurality of color inks are applied, in the image area, is higher than that of areas to which only some of the plurality of color inks are applied, wherein the creation of the image data in the image data creating step is carried out by thinning out the image data on the predetermined ink using a mask pattern for defining arrangement of areas to which one or more of the plurality of inks are allowed to apply, and wherein each mask pattern is provided separately for image data on each of the plurality of color inks, and each arrangement of the areas to which each color ink is allowed to apply, in each mask pattern, differs from each other.

10. The data creating method according to claim 9, wherein the arrangements of the areas to which the each color ink is allowed to apply are defined in each mask pattern such that the number of areas in which all the plurality of color inks are applied is larger than that of areas to which only some of the plurality of color inks are applied.

11. The data creating method according to claim 9, wherein the arrangements of the areas to which each color ink is allowed to apply are defined such that areas to which one color ink is allowed to apply, in one mask pattern, and areas to which another color ink is allowed to apply, in another mask pattern, are not adjacent to one another.

12. A data creating method for creating image data corresponding to each of a plurality of color inks applied to an image area formed on the basis of image data on a predetermined ink, the plurality of color inks being different from the predetermined ink, at least one color ink of the plurality of color inks having at least one of a first characteristic that improves permeability of the predetermined ink and a second characteristic that coagulates a color material in the predetermined ink, the method comprising:

an image data creating step of creating image data corresponding to each of the plurality of color inks on the basis of the image data on the predetermined ink, wherein the image data creating step creates the image data on each of the plurality of color inks so that the rate of areas in which all the plurality of color inks are applied, in the image area, is higher than that of areas to which only some of the plurality of color inks are applied, and wherein the creation of the image data in the image data creating step is carried out by thinning out the image data on the predetermined ink using a mask pattern for defining arrangement of areas to which one or more of the plurality of inks are allowed to apply, and wherein the mask patterns are provided separately for the image data on the plurality of color inks, and each arrangement of the areas to which each color ink is allowed to apply, defined with each mask pattern, are the same.

13. A data creating method for creating image data used to apply a cyan ink, a magenta ink, and a yellow ink to a black image area formed on the basis of image data on a black ink, the method comprising:

an image data creating step of creating image data corresponding to each of the cyan ink, the magenta ink, and the yellow ink on the basis of the image data on the black ink, wherein the image data creating step creates image data on each of the cyan ink, the magenta ink, and the yellow ink so that the rate of pixels in which the three color inks in cyan, magenta, and yellow are applied, in the black image area, is higher than that of pixels to which only one or two of the three color inks are applied, and wherein the cyan ink, the magenta ink, and the yellow ink have higher permeability than the black ink, and the cyan ink contains a component that coagulates a color material of the black ink.

14. The data creating method according to claim 13, wherein the cyan ink which contains the component applies the black image area in a larger amount than each of the magenta and yellow inks which do not contain the component.

15. A data creating method for creating image data used to apply a plurality of color inks in cyan, magenta, and yellow to a black image area formed on the basis of image data on a black ink, the method comprising:

an image data creating step of creating image data corresponding to each of the cyan ink, the magenta ink, and yellow ink on the basis of the image data on the black ink, and wherein the image data creating step creates the image data corresponding to each of the cyan ink, the magenta ink, and yellow ink so that the black image area is comprised of pixels to which only the black ink is applied and pixels to which the three color inks in cyan, magenta, and yellow are applied, and at least one of the cyan ink, the magenta ink, and the yellow ink contains a component that coagulates a color material of the black ink.

* * * * *

UNITED STATES PATENT AND TRADEMARK OFFICE
CERTIFICATE OF CORRECTION

| | |
|---|---|
| PATENT NO. | : 7,270,390 B2 |
| APPLICATION NO. | : 11/066285 |
| DATED | : September 18, 2007 |
| INVENTOR(S) | : Naoko Baba et al. |

Page 1 of 1

It is certified that error appears in the above-identified patent and that said Letters Patent is hereby corrected as shown below:

<u>TITLE PAGE, ITEM [56] REFERENCES CITED</u>:

U.S. Patent Documents, insert --6,145,960  11/2000 Kanda et al.-- and "6,087,604  A" should read --6,084,604 A--.

<u>COLUMN 8</u>:

Line 26, "imp roves" should read --improves--.

Signed and Sealed this

Third Day of February, 2009

JOHN DOLL
*Acting Director of the United States Patent and Trademark Office*